(12) United States Patent
Arai et al.

(10) Patent No.: US 10,416,488 B2
(45) Date of Patent: Sep. 17, 2019

(54) LIQUID CRYSTAL DISPLAY HAVING A PLURALITY OF PIXEL ELECTRODES IN ONE PIXEL REGION

(71) Applicant: TOPPAN PRINTING CO., LTD., Tokyo (JP)

(72) Inventors: Norihiro Arai, Hino (JP); Hiromitsu Ishii, Hino (JP); Ryota Mizusako, Hino (JP); Kunpei Kobayashi, Hino (JP)

(73) Assignee: TOPPAN PRINTING CO., LTD., Tokyo (JP)

( * ) Notice: Subject to any disclaimer, the term of this patent is extended or adjusted under 35 U.S.C. 154(b) by 0 days.

(21) Appl. No.: 15/794,639

(22) Filed: Oct. 26, 2017

(65) Prior Publication Data
US 2018/0046009 A1    Feb. 15, 2018

Related U.S. Application Data

(63) Continuation of application No. PCT/JP2016/062397, filed on Apr. 19, 2016.

(30) Foreign Application Priority Data

May 1, 2015 (JP) ................. 2015-094171

(51) Int. Cl.
*G02F 1/1333* (2006.01)
*G02F 1/1343* (2006.01)
(Continued)

(52) U.S. Cl.
CPC ........ *G02F 1/13338* (2013.01); *G02F 1/1343* (2013.01); *G02F 1/133602* (2013.01);
(Continued)

(58) Field of Classification Search
CPC .................................................. G02F 1/13338
(Continued)

(56) References Cited

U.S. PATENT DOCUMENTS

2005/0280749 A1* 12/2005 Jung ................. G02F 1/133707
349/43
2008/0151146 A1    6/2008 Koito et al.
(Continued)

FOREIGN PATENT DOCUMENTS

JP    2007-316234    12/2007
JP    2008-152158    7/2008
(Continued)

OTHER PUBLICATIONS

International Search Report dated Jul. 19, 2016 in corresponding International Patent Application No. PCT/JP2016/062397.
(Continued)

*Primary Examiner* — Long D Pham

(57) ABSTRACT

A liquid crystal display includes: a first substrate and a second substrate arranged to face each other; a liquid crystal layer provided between the first substrate and the second substrate and having a vertical alignment (VA) mode; a first electrode provided on the first substrate and extending in a first direction; a first pixel electrode and a second pixel electrode which are provided in one pixel region and above the first electrode, with an insulating layer interposed, and which are arrayed in the first direction; a first contact member which connects the first electrode and the first pixel electrode to each other; a second contact member which connects the first electrode and the second pixel electrode to each other; and a common electrode provided on the second substrate.

11 Claims, 13 Drawing Sheets

(51) Int. Cl.
*G02F 1/1335* (2006.01)
*G06F 3/041* (2006.01)
*G06F 3/044* (2006.01)
*G02F 1/1362* (2006.01)

(52) U.S. Cl.
CPC .. *G02F 1/134309* (2013.01); *G02F 1/136227* (2013.01); *G06F 3/044* (2013.01); *G06F 3/0412* (2013.01); *G02F 2001/134345* (2013.01); *G06F 2203/04112* (2013.01)

(58) Field of Classification Search
USPC .......................................................... 345/87
See application file for complete search history.

(56) References Cited

U.S. PATENT DOCUMENTS

| | | | | |
|---|---|---|---|---|
| 2010/0045915 A1* | 2/2010 | No | ................... | G02F 1/133514 349/138 |
| 2010/0051951 A1* | 3/2010 | Lee | ................... | G02F 1/136209 257/59 |
| 2012/0146971 A1* | 6/2012 | Yoon | ................... | G02F 1/13439 345/205 |

FOREIGN PATENT DOCUMENTS

| | | |
|---|---|---|
| JP | 2008-250323 | 10/2008 |
| KR | 10-2008-0036367 | 4/2008 |
| TW | 200837439 | 9/2008 |
| WO | WO 2009/013855 A1 | 1/2009 |

OTHER PUBLICATIONS

Written Opinion of the International Searching Authority dated Jul. 19, 2016 in corresponding International Patent Application No. PCT/JP 2016/062397.

English Language Translation of the International Preliminary Report on Patentability dated Nov. 16, 2017 in corresponding International Patent Application No. PCT/JP/2016/062397.

Taiwanese Office Action dated Dec. 16, 2016 in corresponding Taiwanese Patent Application No. 105113221.

Japanese Office Action dated Feb. 5, 2019 in corresponding Japanese Patent Application No. 2015-094171 (5 pages).

* cited by examiner

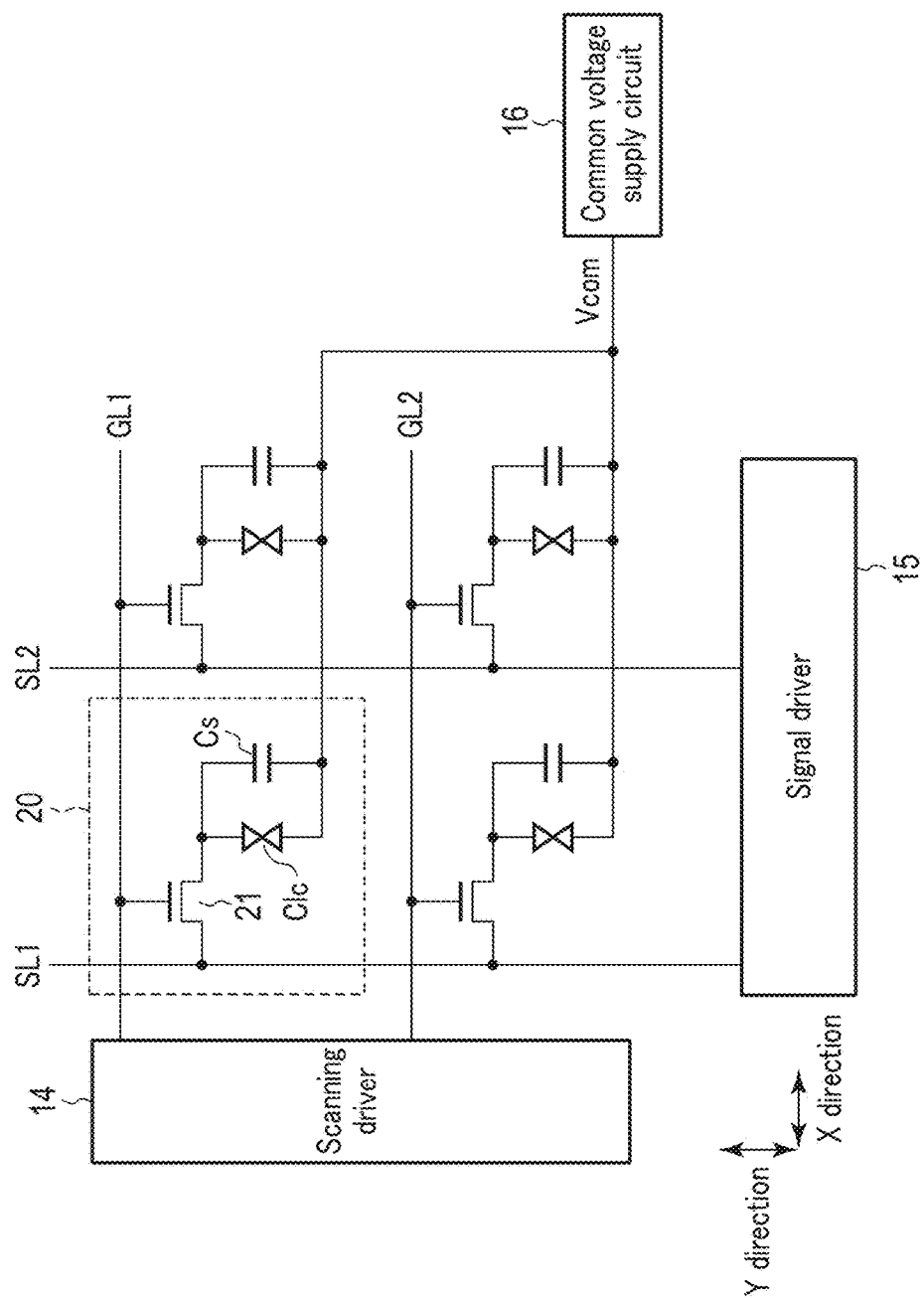
F I G. 3

Normal alignment  Abnormal alignment
(a)  (b)

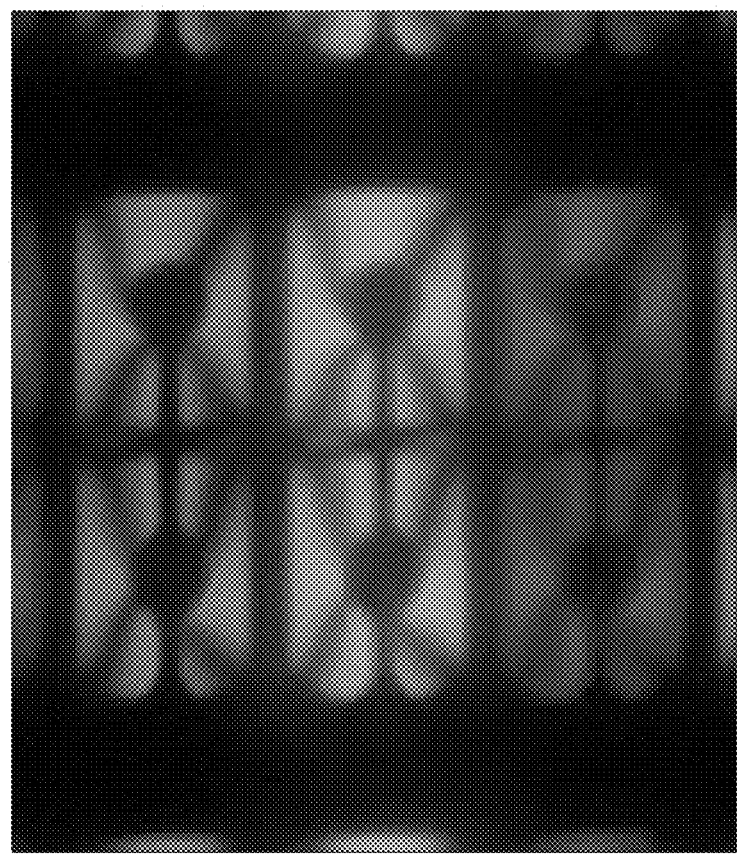
F I G. 10
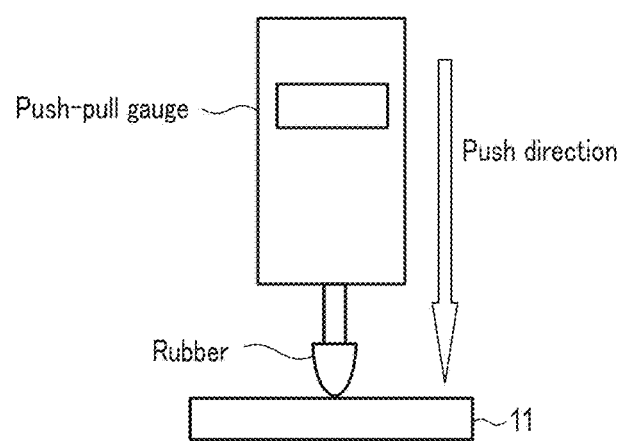
F I G. 11

Surface push test

| Brightness level | Comparative example panel | Embodiment panel |
|---|---|---|
| 100% (white) | × | 4 sec |
| 90% | × | 4 sec |
| 80% | × | 4 sec |
| 70% | × | 4 sec |
| 60% | × | 4 sec |
| 50% | 12 sec | 3 sec |
| 40% | 10 sec | 3 sec |
| 30% | 6 sec | 3 sec |
| 20% | 4 sec | 2 sec |
| 10% | 2 sec | 1 sec |
| 0% (black) | ○ | ○ |

× : 30 sec or longer
○ : Not generated

F I G. 12

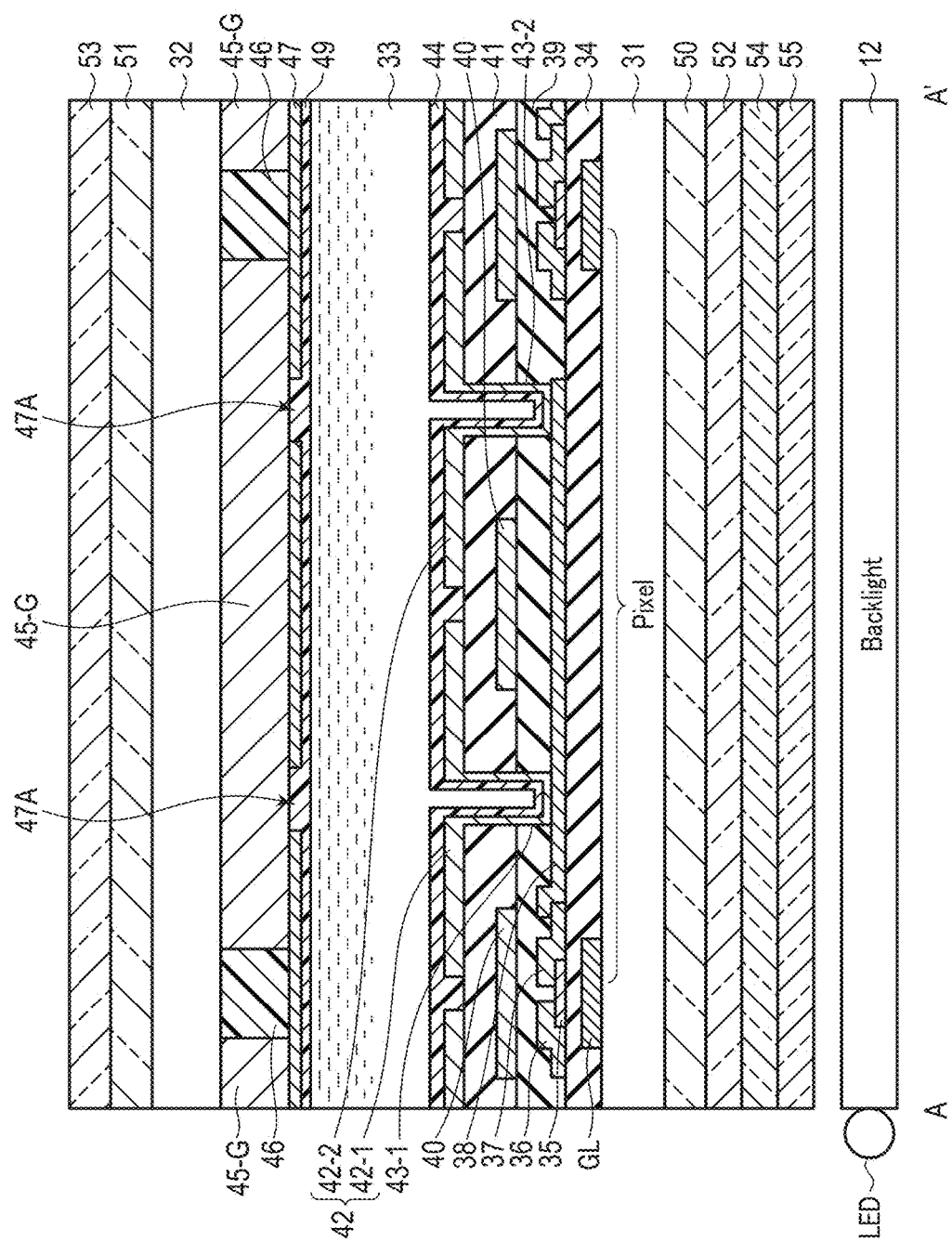
F I G. 14

LIQUID CRYSTAL DISPLAY HAVING A PLURALITY OF PIXEL ELECTRODES IN ONE PIXEL REGION

CROSS-REFERENCE TO RELATED APPLICATIONS

This application is a Continuation Application of PCT Application No. PCT/JP2016/062397, filed Apr. 19, 2016, and based upon and claiming the benefit of priority from Japanese Patent Application No. 2015-094171, filed May 1, 2015, the entire contents of all of which are incorporated herein by reference.

BACKGROUND OF THE INVENTION

1. Field of the Invention

The present invention relates to a liquid crystal display.

2. Description of the Related Art

A liquid crystal display is employed in a mobile device such as a mobile phone, a smart phone, a tablet terminal or the like. As the liquid crystal mode of the liquid crystal display, the vertical alignment (VA) mode, the lateral electric field mode or the like are used.

In many cases, a touch panel is arranged on the liquid crystal display. In this case, when the touch panel is operated, the liquid crystal display is indirectly depressed, and a display defect (surface depression defect) attributable to the disturbance of the liquid crystal alignment may occur at the depressed portion. Although the surface depression defect disappears with time, it should desirably disappear in a shortest possible time.

Where the VA mode is used as the liquid crystal mode, the liquid crystal molecules align in the vertical direction, so that the time in which the surface press time disappears tends to be long. In addition, the alignment of liquid crystals may be fixed in an abnormal state, depending upon the structure of pixels, and the surface depression defect may not recover.

BRIEF SUMMARY OF THE INVENTION

According to an aspect of the present invention, there is provided a liquid crystal display comprising:
a first substrate and a second substrate arranged to face each other;
a liquid crystal layer provided between the first substrate and the second substrate and having a vertical alignment (VA) mode;
a first electrode provided on the first substrate and extending in a first direction;
a first pixel electrode and a second pixel electrode which are provided in one pixel region and above the first electrode, with an insulating layer interposed, and which are arrayed in the first direction;
a first contact member which connects the first electrode and the first pixel electrode to each other;
a second contact member which connects the first electrode and the second pixel electrode to each other; and
a common electrode provided on the second substrate.

BRIEF DESCRIPTION OF THE SEVERAL VIEWS OF THE DRAWINGS

FIG. 3 is a circuit diagram illustrating a pixel array according to the first embodiment.

FIG. 10 illustrates a display state of the display panel of the first embodiment.

FIG. 11 is a schematic diagram illustrating how a surface push test is performed for a display panel.

FIG. 12 illustrates results of the surface push test performed for the display panel.

FIG. 14 is a sectional view of a display panel according to the third embodiment.

DETAILED DESCRIPTION OF THE INVENTION

Figure 1:
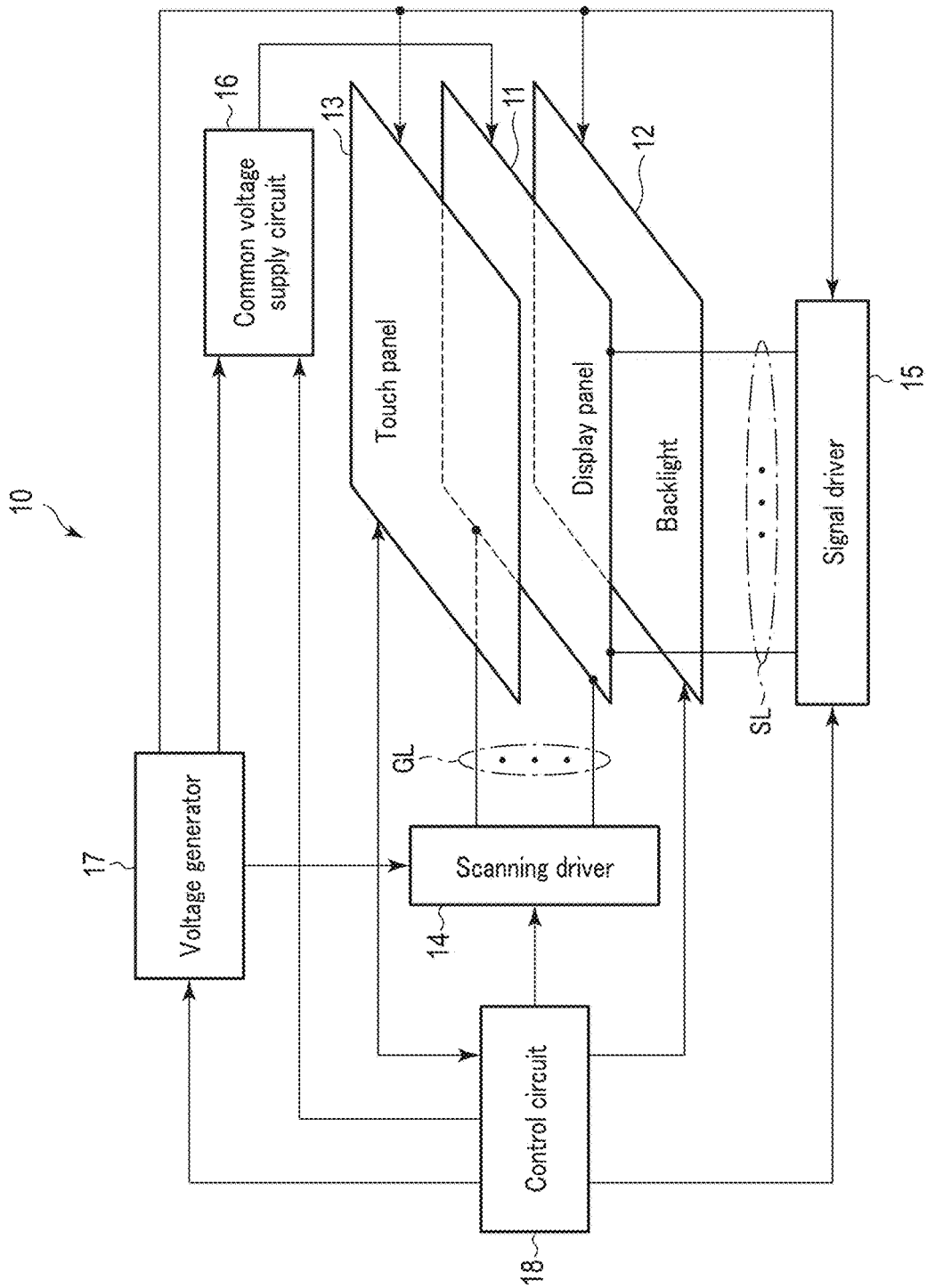
FIG. 1 is a block diagram illustrating a liquid crystal display according to the first embodiment.

A description will now be given of the embodiments with reference to the accompanying drawings. It should be noted that the drawings are schematic and illustrate the technical concepts, and the dimensions and scales in the drawings are not necessarily the same as the actual products. Where the same portion is depicted in different drawings, the dimensions and scale of one drawing may be different from those of another. Several embodiments described below merely show exemplary apparatuses and methods that implement the technical ideas of the present invention. The technical ideas are not limited to the shapes, structures or arrangements of the constituent elements. In the descriptions given below, structural elements having substantially the same functions and configurations will be denoted by the same reference symbols, and a repetitive description of such elements will be given only where necessary.

First Embodiment

[1] Overall Structure of Liquid Crystal Display

FIG. 1 is a block diagram showing a liquid crystal display 10 according to the first embodiment of the present invention. The liquid crystal display 10 includes a display panel 11, a backlight (illumination device) 12, a touch panel 13, a scanning driver (scanning line drive circuit) 14, a signal driver (signal line drive circuit) 15, a common voltage supply circuit 16, a voltage generator 17 and a control circuit 18.

The display panel 11 includes, for example, a pixel array in which a plurality of pixels are arranged in a matrix. A plurality of scanning lines GL extending in the row direction (X direction) and a plurality of signal lines SL extending in the column direction (Y direction) are arranged in the display panel 11. A pixel is arranged at each intersection between the scanning lines GL and the signal lines SL.

The backlight 12 is an illumination device for emitting light to the back surface (the surface opposite the display surface) of the display panel 11. The backlight 12 is a surface light source. The backlight 12 is, for example, a direct type or a side-light type (edge-light type) LED backlight.

The touch panel 13 is provided on the display surface of the display panel 11. The touch panel 13 senses that the user depresses the panel and identifies the coordinates of the depressed position (tapped position). The touch panel 13 may be any one of the following: a resistance film type, an electrostatic capacitance type, an electromagnetic induction type, an ultrasonic surface acoustic wave type, and an infrared scan type.

The scanning driver 14 is connected to the scanning lines GL. Based on a vertical control signal supplied from the control circuit 18, the scanning driver 14 supplies the display panel 11 with a scanning signal used for turning on or off the switching elements included in the pixels.

The signal driver 15 is connected to a plurality of signal lines (source lines) SL. The signal driver 15 receives a horizontal control signal and image data from the control circuit 18. Based on the horizontal control signal, the signal driver 15 supplies the display panel 11 with a gradation signal (driving voltage) corresponding to the image data.

The common voltage supply circuit 16 generates a common voltage Vcom and applies it to the display panel 11. For example, the display panel 11 performs inversion driving (AC driving), in which the polarity of an electric field applied to the liquid crystal layer, i.e., the polarity of the voltage applied between the pixel electrode and common electrode, is inverted in a predetermined period. In the inversion driving, the polarity of a common voltage Vcom and the polarity of a driving voltage are inverted in a predetermined period.

The voltage generator 17 generates various voltages required for the operation of the liquid crystal display 10 and applies them to the respective circuits. The control circuit 18 receives image data from an external device. Based on the image data, the control circuit 18 supplies various control signals to the respective circuits of the liquid crystal display 10.

Figure 2:
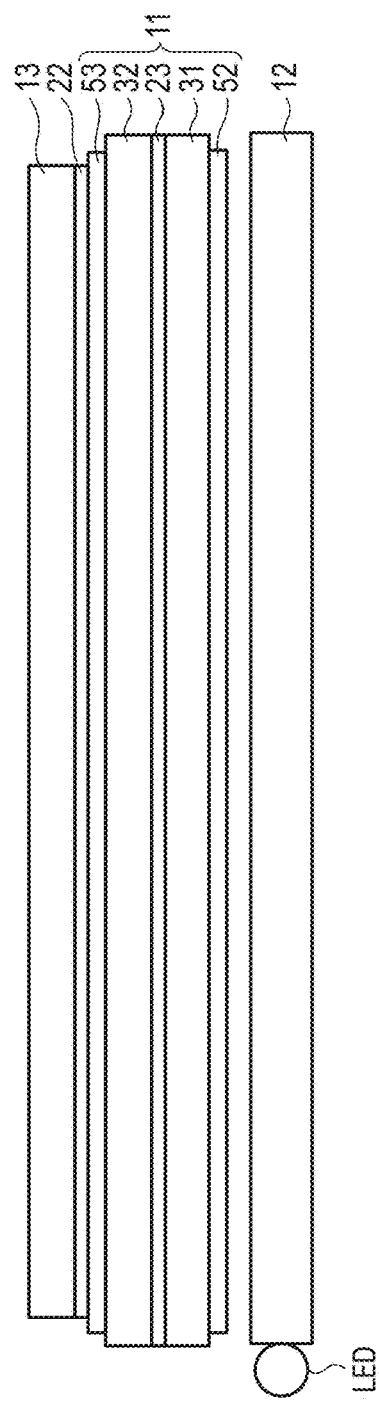
FIG. 2 is a side view of the liquid crystal display of the first embodiment.

A description will be given of the stacked structure the liquid crystal display 10. FIG. 2 is a side view of the liquid crystal display 10.

The backlight 12 is, for example, a side-light type (edge-light type) illumination device. The backlight 12 includes a reflective sheet, a light guide plate, a diffusion sheet and a prism sheet, which are stacked in the order mentioned, and also includes a light-emitting element arranged on one side of the light guide plate. The light-emitting element is made of a single or a plurality of white LEDs (light-emitting diodes). The light emitted from the LEDs is incident on the side surface of the light guide plate and is reflected by the reflective sheet. The light reflected by the reflective sheet passes through the light guide plate, the diffusion sheet and the prism sheet, and travels toward the display panel 11.

The display panel 11 is provided on the backlight 12. The display panel 11 includes substrates 31 and 32, a seal member 23 sandwiched between substrates 31 and 32 and serving to seal the liquid crystal layer sandwiched between the substrates 31 and 32, and polarizers 52 and 53 between which substrates 31 and 32 are sandwiched.

The touch panel 13 is provided on the display panel 11. The touch panel 13 is fixed to the display panel 11 by use of a transparent adhesive 22.

The backlight 12, the display panel 11 and the touch panel 13 are fixed together by mean of a case (not shown) surrounding the periphery of them.

[2] Structure of Pixel

A description will be given of the structure of a pixel array included in the display panel 11. FIG. 3 is a circuit diagram of a pixel array. In FIG. 3, four pixels 20 are shown.

Each pixel 20 includes a switching element 21, a liquid crystal capacitor (liquid crystal element) Clc and a storage capacitor Cs. The switching element 21 is, for example, a thin film transistor (TFT) or an n-channel TFT.

The source of the TFT 21 is electrically connected to a signal line SL. The gate of the TFT 21 is electrically connected to a scanning line GL. The drain of the TFT 21 is electrically connected to the liquid crystal capacitor Clc. The liquid crystal capacitor Clc serving as a liquid crystal element includes a pixel electrode, a common electrode, and a liquid crystal layer sandwiched between these two electrodes.

The storage capacitor Cs is connected in parallel with the liquid crystal capacitor Clc. The storage capacitor Cs functions to suppress potential variations at the pixel electrode and to retain a driving voltage applied to the pixel electrode until the driving voltage corresponding to the next signal is applied. The storage capacitor Cs includes a pixel electrode, a storage electrode, and an insulating layer sandwiched between these two electrodes. The common electrode and the storage electrode are applied with a common voltage Vcom by the common voltage supply circuit 16.

[3] Structure of Display Panel 11

Figure 4:
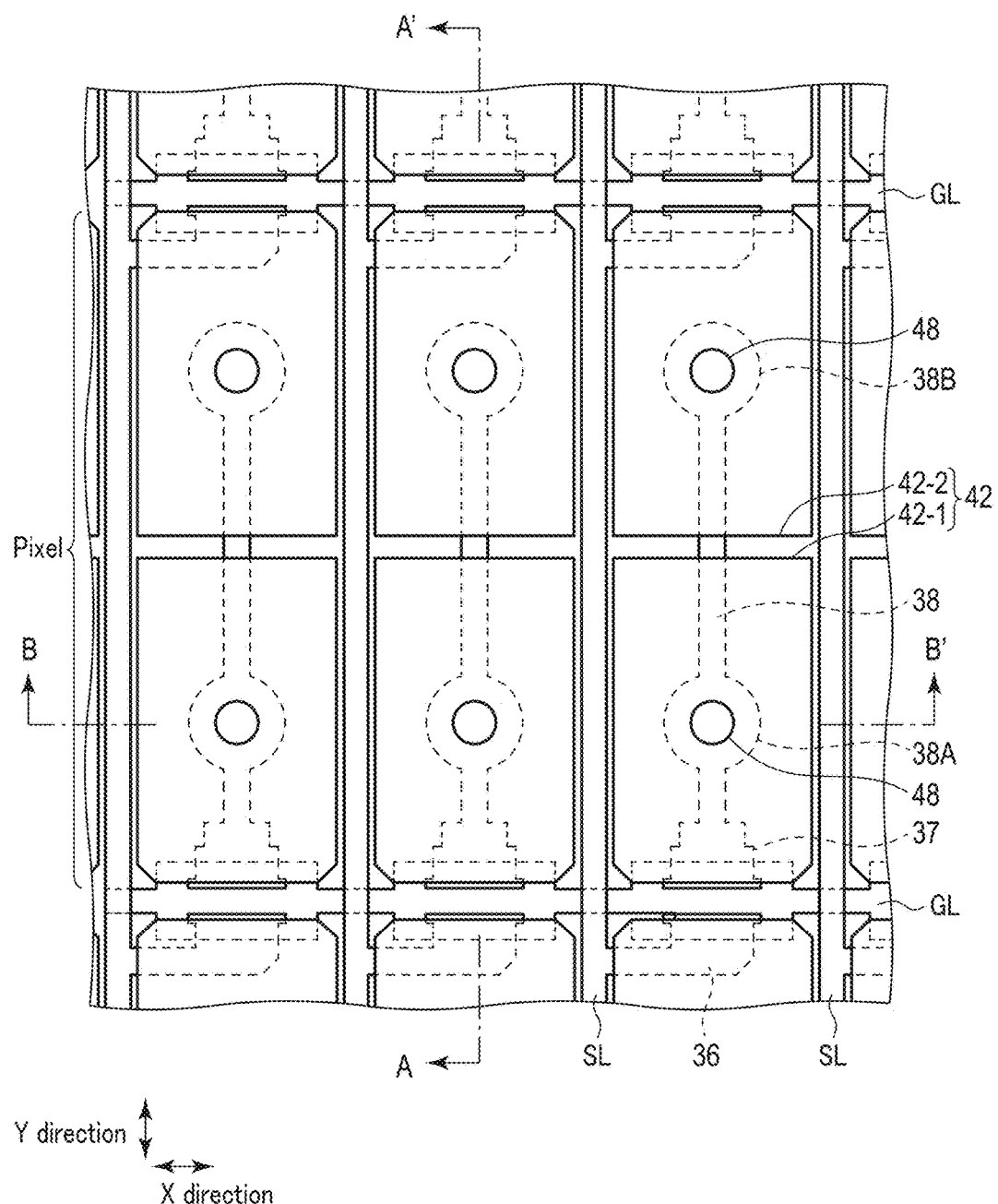
FIG. 4 is a plan view of a display panel according to the first embodiment.
Figure 5:
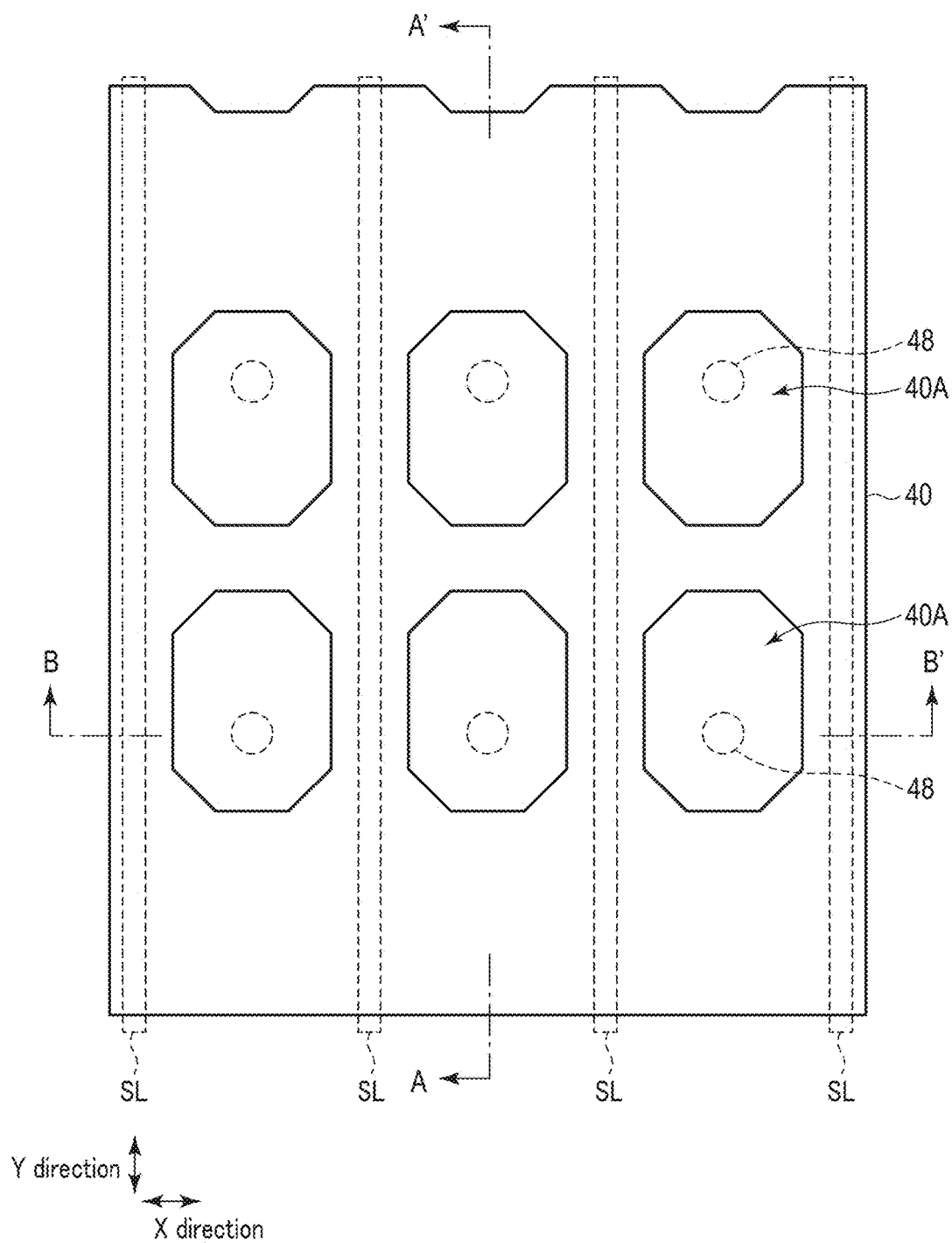
FIG. 5 is a plan view of a storage electrode of the first embodiment.
Figure 6:
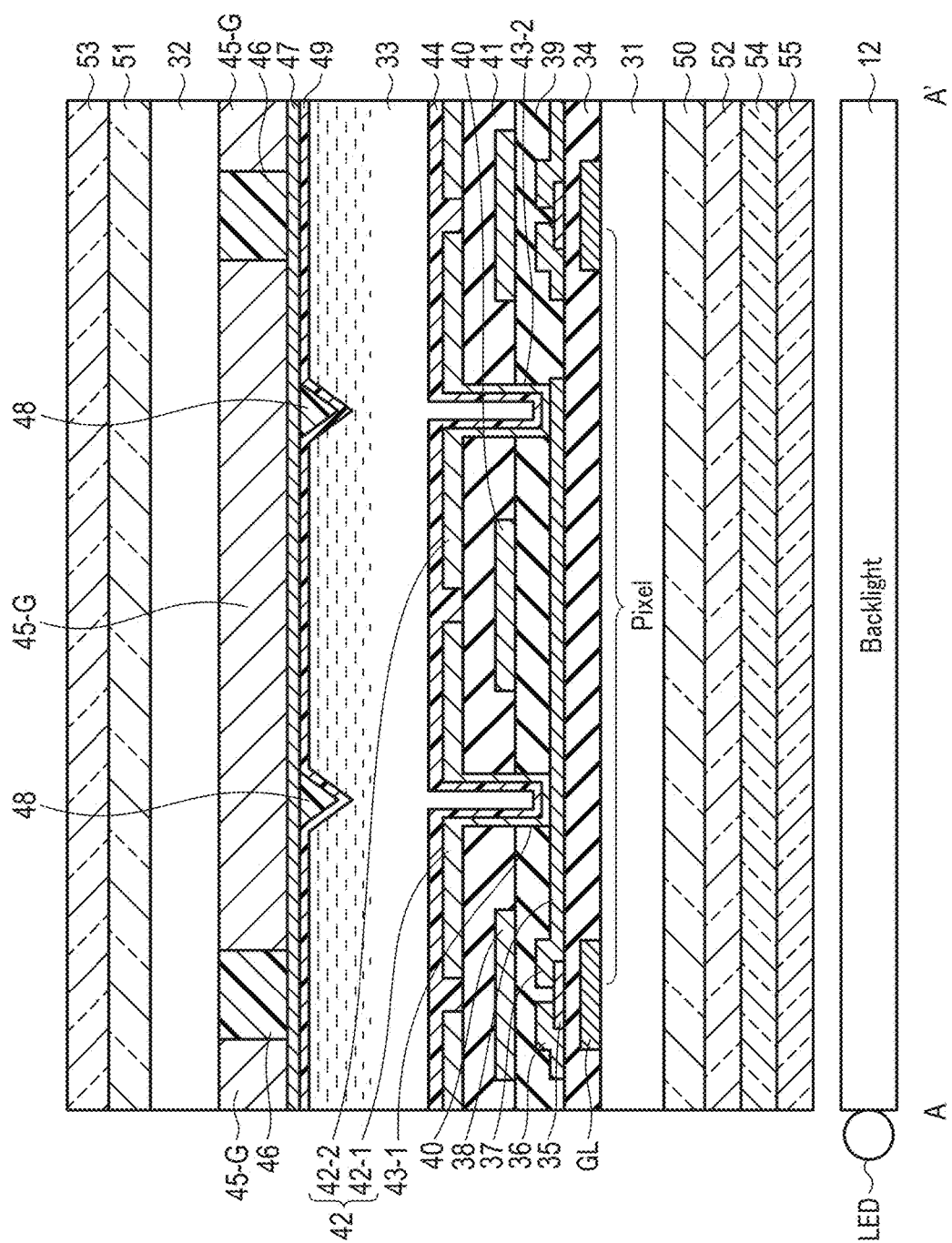
FIG. 6 is a sectional view of the display panel taken along line A-A' of FIG. 4.
Figure 7:
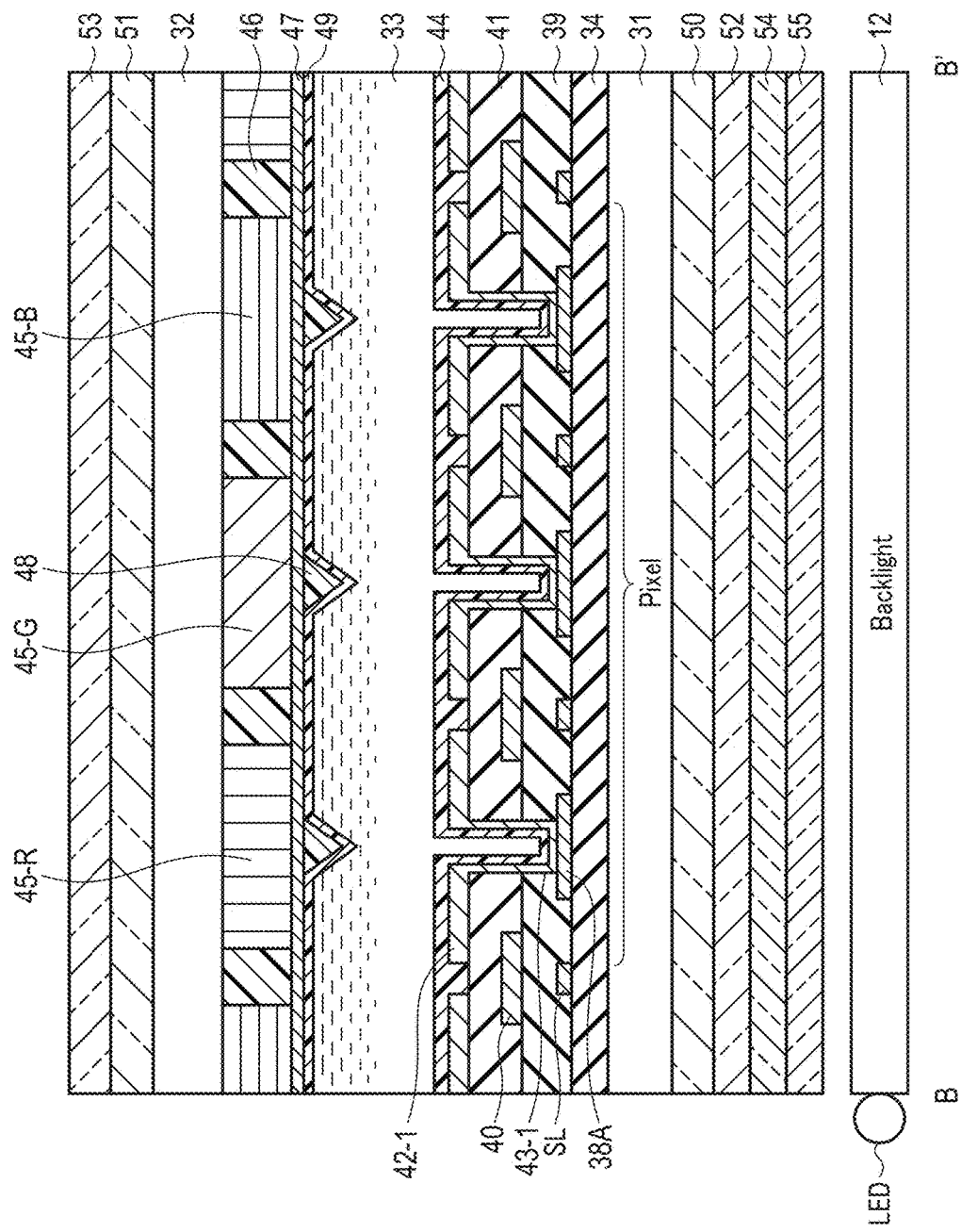
FIG. 7 is a sectional view of the display panel taken along line B-B' of FIG. 4.

Next, a description will be given of the structure of the display panel 11. FIG. 4 is a plan view of the display panel 11. FIG. 5 is a plan view of a storage electrode 40. FIG. 6 is a sectional view of the display panel 11 taken along line A-A' of FIG. 4. FIG. 7 is a sectional view of the display panel 11 taken along line B-B' of FIG. 4.

The display panel 11 is provided with: a TFT substrate 31 on which a TFT, a pixel electrode, etc. are formed; a color filter substrate (CF substrate) 32 which is arranged to face the TFT substrate and on which a color filter, a common electrode, etc. are formed; and a liquid crystal layer 33 sandwiched between the TFT substrate 31 and the CF substrate 32. Each of the TFT substrate 31 and the CF substrate 32 are made of a transparent substrate (e.g., a glass substrate). The CF substrate 32 is arranged on the side closer to the backlight 12, and the illumination light from the backlight 12 enters the liquid crystal layer 33 from the CF substrate 32. Of the two major surfaces of the display panel 11, the major surface which is opposite to the backlight 12 is a display surface of the display panel 11.

The liquid crystal layer 33 is made of a liquid crystal material sealed by the seal member 23, by which the TFT substrate 31 and the CF substrate 32 are pasted. The optical characteristics of the liquid crystal material vary when the alignment of the liquid crystal molecules is controlled in accordance with the electric field applied between the pixel electrode and the common electrode. The display mode of the display panel 11 is a VA mode using vertical alignment (VA) type liquid crystals. To be more specific, negative-type (N-type) nematic liquid crystals are used as the liquid crystal layer 33, and the liquid crystal layer 33 has its liquid crystal molecules aligned substantially perpendicularly to the substrate surface when no electric field is applied. How the liquid crystal molecules align in the VA mode is that the long axis (director) of the liquid crystal molecules aligns vertically when no electric field is applied and aligns horizontally when an electric field is applied.

The scanning line GL functioning as the gate electrode of the TFT 21 is provided on that side of the TFT substrate 31 which is closer to the liquid crystal layer 33. An insulating layer 34 serving as the gate insulating film of the TFT 21 is provided on the scanning line GL. A semiconductor layer (e.g., amorphous silicon layer) 35 is provided on the insulating layer 34. A source electrode 36 and a drain electrode 37 are provided on the semiconductor layer 35 such that they are separate from each other. The gate electrode (scanning line GL), the gate insulating film (insulating layer 34), the semiconductor layer 35, the source electrode 36 and the drain electrode 37 jointly constitute the TFT 21.

An electrode 38 electrically connected to the drain electrode 37 and extending in the Y direction from the drain electrode 37 is provided on the insulating layer 34. When viewed in the plan view, the electrode 38 is in the Y-direction center of the pixel. The electrode 38 is integral with the drain electrode 37, and is formed in the same manufacturing step as the drain electrode 37.

The signal line SL extending in the Y direction is provided on the insulating layer 34. The signal line SL is electrically connected to the source electrode 36.

The signal line SL, the source electrode 36, the drain electrode 37 and the electrode 38 are overlaid with an insulating layer 39. A storage electrode 40 constituting the storage capacitor Cs is provided on the insulating layer 39. When viewed in the plan view, the storage electrode 40 partly overlaps the pixel electrode. As shown in FIG. 5, the storage electrode 40 as a planar electrode is formed entirely in the display area of the display panel 11 and has a plurality of openings 40A through which contact members for electrical connection between the pixel electrode and the drain electrode are made to pass.

The storage electrode 40 is overlaid with an insulating layer 41. A pixel electrode 42 is provided on the insulating layer 41. The pixel electrode 42 is provided entirely in the region of the pixel 20, and is divided as two pixel electrodes 42-1 and 42-2 arrayed in the Y direction.

In FIG. 4, each pixel 20 has a region defined by the two adjacent signal lines SL and the two adjacent scanning lines GL. The planar shape of the pixel 20 is substantially rectangular. The pixel electrodes 42-1 and 42-2 are arranged in the long-side direction of the pixel 20, and each of the pixel electrodes 42-1 and 42-2 has a virtually square planar shape. In other words, the pixel electrodes 42-1 and 42-2 are formed by dividing a pixel electrode having substantially the same planar shape as the pixel 20 into two. For example, the pixel electrodes 42-1 and 42-2 are formed by dividing the pixel electrode in the center of the pixel 20 and have substantially the same area. In other words, the boundary between the pixel electrodes 42-1 and 42-2 is substantially in the center of the pixel 20, as viewed in the Y direction. The pixel electrodes 42-1 and 42-2 are completely separate from each other; they are not electrically connected in the same layer.

Pixel electrode 42-1 is electrically connected to electrode 38 by means of contact member 43-1 extending through insulating layers 39 and 41. When viewed in the plan view, contact member 43-1 is located in the center of pixel electrode 42-1. For example, contact member 43-1 is formed simultaneously with a pixel electrode by forming an opening penetrating insulating layers 39 and 41 and forming a film on the side and bottom surfaces of that opening using the same electrode material as the pixel electrode. For reliable connection between contact member 43-1 and electrode 38, electrode 38 includes a connection portion 38A having a diameter larger than the width of electrode 38. Contact member 43-1 is provided on the connection portion 38A.

Pixel electrode 42-2 is electrically connected to electrode 38 by means of contact member 43-2 extending through insulating layers 39 and 41. When viewed in the plan view, contact member 43-2 is located in the center of pixel electrode 42-2. Contact member 43-2 is similar to contact member 43-1 in terms of the structure. Contact member 43-1 is provided on the connection portion 38B of electrode 38.

The pixel electrode 42 is overlaid with an alignment film 44. In the state where no electric field is applied (initial state), the alignment film 44 controls the alignment of the liquid crystal layer 33.

Color filters 45 are provided on that side of the CF substrate 32 which is closer to the liquid crystal layer 33. The color filters 45 include a plurality of coloring filters (coloring members). Specifically, the color filters 45 include a plurality of red filters 45-R, a plurality of green filters 45-G and a plurality of blue filters 45-B. General color filters include filters of light's three primary colors, namely, red (R), green (G) and blue (B). An adjacent set of filters of R, G and B colors functions as a unit of display (a pixel). Each of the single-color portions of one pixel is a minimum drive unit referred to as a sub pixel. The TFT 21 and the pixel electrode 42 are provided for each sub pixel. In the descriptions below, the sub pixels will be referred to simply as pixels, provided that the pixels and the sub pixels do not have to be discriminated from each other.

A light-shielding black mask (light-shielding film) 46 is provided on the boundaries between the red filters 45-R, the green filters 45-G and the blue filters 45-B and on the boundaries between the pixels (sub pixels). For example, the black mask 46 is formed in a lattice pattern. The black mask 46 serves to shield the unwanted light between the coloring members and to enhance the contrast.

A common electrode 47 is provided on the color filters 45 and the black mask 46. The common electrode 47 as a planar electrode is provided entirely in the display area of the display panel 11. A plurality of columnar spacers (not shown), used for adjusting the thickness (cell gap) of the liquid crystal layer 33, are arranged between the common electrode 47 and the insulating layer 41.

A plurality of projections 48, used for controlling the alignment of the liquid crystals, are provided on the common electrode 47. In other words, the display panel 11 uses an alignment division (multi-domain) system. Each of the projections 48 has a conical shape and serves to control the direction in which the liquid crystal molecules tilt. The projections 48 are arranged at positions where they overlap the contact members 43 (43-1, 43-2) when viewed in the plan view. In the two regions (domains) on the respective sides of each projection 48, the liquid crystal molecules tilt in opposite directions. Because of the projections 48, the liquid crystal layer 33 includes a plurality of regions having different tilt directions of liquid crystal molecules. Since the multi-domain system is used, the emitted light can be made uniform in the entire screen, and the viewing angle dependence can be improved.

The common electrode 47 and the projections 48 are overlaid with an alignment film 49. In the state where no electric field is applied (initial state), the alignment film 49 controls the alignment in the liquid crystal layer 33.

Retardation plates 50 and 51 are provided such that they sandwich the TFT substrate 31 and the CF substrate 32.

Polarizers 52 and 53 are provided such that they sandwich the retardation plates 50 and 51. Retardation plate 50 and polarizer 52 jointly form a circular polarizer, and retardation plate 51 and polarizer 53 jointly form a circular polarizer.

In the plane perpendicular to the light traveling direction, the polarizers 52 and 53 have a transmission axis and an absorption axis perpendicular to each other. Of the light whose oscillation planes are in random directions, the linearly-polarized light (linearly-polarized components of light) having oscillation planes parallel to the transmission axis is allowed to pass through the polarizers 52 and 53, while the linearly-polarized light (linearly-polarized components of light) having oscillation planes parallel to the absorption axis is absorbed by the polarizers 52 and 53. The polarizers 52 and 53 are arranged, with their transmission axes being perpendicular to each other. That is, the polarizers 52 and 53 are arranged in the orthogonal nicol state.

The retardation plates 50 and 51 have refractive index anisotropy, and in the plane perpendicular to the light traveling direction they have a slow axis and a fast axis perpendicular to each other. The retardation plates 50 and 51 have the function of providing a predetermined retardation between the light of predetermined wavelength that has passed through the slow axis and the light of predetermined wavelength that has passed through the fast axis (the retardation is a phase difference of $\lambda/4$ provided that the wavelength of the light is $\lambda$). That is, the retardation plates 50 and 51 are ¼ wavelength plates ($\lambda/4$ plates). The slow axis of retardation plate 50 is set to form approximately 45° with respect to the transmission axis of polarizer 52. The slow axis of retardation plate 51 is set to form approximately 45° with respect to the transmission axis of polarizer 53.

The angles mentioned above in connection with the polarizers and retardation plates may include errors caused for attaining desirable operations and errors attributable to the manufacturing process. For example, the above-mentioned angle of approximately 45° is assumed to include an angle range of 45°±5°. For example, being "perpendicular" is assumed to include an angle range of 90°±5°.

On that side of polarizer 52 which is closer to the backlight, a diffusion film 54 and a brightness enhancement film 55 are provided in this order. The diffusion film 54 diffuses (scatters) the transmission light in random directions, thereby making the transmission light uniform.

The brightness enhancement film (prism sheet) 55 is a film on which unit prisms having a triangular cross section are periodically arranged in one direction. In the arrangement direction of the unit prisms, the brightness enhancement film 55 changes the direction of incident light and performs retroreflection for the recycling of light. Since the brightness of display light has to be controlled in the horizontal direction and vertical direction of the display in practice, two optical sheets are often laid on each other such that the arrangement direction of a group of prisms of one optical sheet intersect with the arrangement direction of a group of prisms of the other optical sheet.

The storage electrode 40, the pixel electrode 42, the contact member 43 and the common electrode 47 are transparent electrodes which are made, for example, of an indium tin oxide (ITO). The insulating layers 34, 39 and 41 are made of a transparent insulating material; they are formed of silicon nitride (SiN), for example. The source electrode 36, the drain electrode 37, the electrode 38, the scanning line GL and the signal line SL are made, for example, of one of aluminium (Al), molybdenum (Mo), chromium (Cr) and tungsten (W), or an alloy containing at least one kind of these materials. The projections 48 are made, for example, of a transparent resin.

[4] Operation

A description will be given as to how the liquid crystal display 10 having the above structure operates. To perform image display, the control circuit 18 controls the voltages of the pixel electrode 42 and common electrode 47 so as to control the electric field applied to the liquid crystal layer 33. Where the pixel electrode 42 and the common electrode 47 are substantially at the same voltage, the liquid crystal display is in the OFF state. Where one of the pixel electrode 42 and the common electrode 47 is at a positive voltage, and the other electrode is at 0V, the liquid crystal display is in the ON state.

In the OFF state, the liquid crystal molecules of the liquid crystal layer 33 have their long axes aligned in the vertical direction. The incident light traveling from the backlight 12 passes through polarizer 52, thereby changing into linearly polarized light, and then passes through retardation plate 50, thereby changing into circularly polarized light. The liquid crystal layer has substantially no refractive index anisotropy in a plane parallel to the substrate. Therefore, the circularly polarized light travels through the liquid crystal layer 33 substantially in the same state. After traveling through the liquid crystal layer 33, the circularly polarized light travels through retardation plate 51, thereby changing into linearly polarized light. Since this linearly polarized light is parallel to the absorption axis of polarizer 53, it is absorbed by polarizer 53. In the OFF state, therefore, the liquid crystal display 10 is in the black display mode. That is, the liquid crystal display 10 is in the normally black mode.

In the ON state, the liquid crystal molecules of the liquid crystal layer 33 align such that they are tilted with reference to the horizontal direction. Assuming that the wavelength $\lambda = 550$ nm, the retardation $\Delta nd$ of the liquid crystal layer 33 in the ON state is approximately 275 nm ($=\lambda/2$). It is to be noted that "$\Delta n$" is the birefringence of the liquid crystal layer and "d" is the thickness of the liquid crystal layer.

The incident light traveling from the backlight 12 passes through polarizer 52, thereby changing into linearly polarized light, and then passes through retardation plate 50, thereby changing into circularly polarized light. Since the retardation $\Delta nd$ of the liquid crystal layer 33 is 275 nm, the circularly polarized light having passed through the liquid crystal layer 33 changes into circularly polarized light whose polarization direction is opposite. After traveling through the liquid crystal layer 33, the circularly polarized light travels through retardation plate 51, thereby changing into linearly polarized light. Since this linearly polarized light is parallel to the transmission axis of polarizer 53, it passes through polarizer 53. In the ON state, therefore, the liquid crystal display 10 is in the white display mode. To be more specific, the liquid crystal display 10 displays the color corresponding to the color filter.

In the present embodiment, pixel 20 having a rectangular planar shape includes two pixel electrodes 42-1 and 42-2. The pixel electrodes 42-1 and 42-2 are arranged in the long-side direction of the pixel 20 (in the Y direction), and each of the pixel electrodes 42-1 and 42-2 has a substantially square planar shape. The pixel electrodes 42-1 and 42-2 in the same layer are not connected because there is no electrode for connection in that layer. The pixel electrodes 42-1 and 42-2 are electrically connected to the electrode 38 connected to the source electrode 36, by way of contact members 43-1 and 43-2. With this structure, the pixel electrodes 42-1 and 42-2 are at the same potential. Because of this, the electric filed applied to the liquid crystal layer 33 is prevented from becoming non-uniform due to the shape of the pixel electrodes 42-1 and 42-2.

A projection 48 is arranged in the center (or in the vicinity thereof) of each of the pixel electrodes 42-1 and 42-2. With this structure, the liquid crystal molecules tilt radially around the projection 48 in the region of pixel electrode 42-1 (or pixel electrode 42-2). Even if the display panel 11 is pushed directly or with the touch panel interposed, the liquid crystals are easily restored to the normal alignment state which they are in before the display panel 11 is pushed. As a result, the time required for restoration to the normal state can be shortened. When viewed in the plan view, the storage electrode 40 is arranged on the boundary between pixel electrodes 42-1 and 42-2 arrayed in the Y direction, on the boundary between two pixel electrodes 42-1 arrayed in the X direction, and on the boundary between two pixel electrodes 42-2 arrayed in the X direction. The control circuit 18 applies the common voltage Vcom to the storage electrode 40, which voltage is the same voltage as is applied to the common electrode 47. As a result, the electric field is zero (or is weak) on the above-noted boundaries between pixel electrodes, and the liquid crystal molecules at the boundaries keep aligning substantially in the vertical direction. Because of this, even when the display panel 11 is pushed directly or with the touch panel interposed, the liquid crystals can return to the normal alignment state, and the display defect (surface depression defect) caused by the surface push, i.e., the push of the display surface of the display panel, can disappear in a short time.

The contact members 43-1 and 43-2 are arranged such that they do not overlap the projections 48 when viewed in the plan view. With this structure, the alignment center of the liquid crystals can be at the positions where the projections 48 and the contact members 43-1 and 43-2 overlap each other. In other words, the contact members 43-1 and 43-2 enable the regions where the liquid crystals are immovable to align with the projections 48. With this structure, the liquid crystals can align in a stable manner, and the surface depression defect can disappear in a short time.

Part of the storage electrode 40 may be made of a conductive material that is not transparent. For example, that part of the storage electrode 40 which is located above the TFT (i.e., the region which hardly affects the transmittance of the display panel 11) may be made of a conductive material that is not transparent. Aluminium (Al), molybdenum (Mo), chromium (Cr), tungsten (W), or an alloy containing at least one kind of these materials is used as the nontransparent conductive material of the storage electrode 40. Because of this, the storage electrode 40 can shield the TFT 21. Accordingly, the deterioration the OFF characteristics of the TFT 21 can be suppressed, and the leak current of the TFT 21 can be decreased.

[5] Comparative Example

Figure 8:
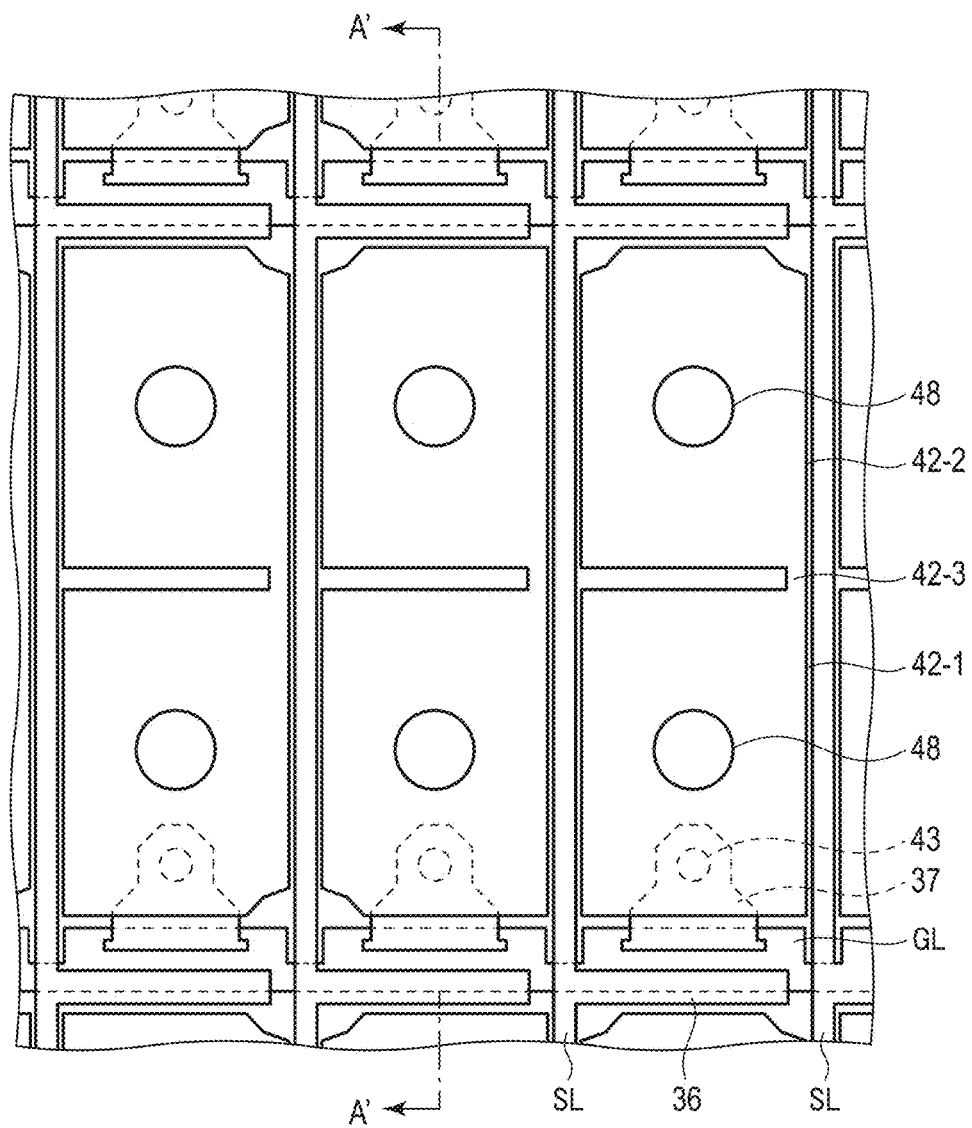
FIG. 8 is a plan view of a display panel according to a comparative example.

A description will be given of the structure of a display panel according to a comparative example. FIG. 8 is a plan view of the display panel of the comparative example.

Pixel electrodes 42-1 and 42-2 are electrically connected to each other through a connection electrode 42-3 in the same layer. That is, in the comparative example, pixel electrodes 42-1 and 42-2 are applied with the same voltage by the connection electrode 42-3. Pixel electrode 42-2 is electrically connected to electrode 37 through a contact member 43. The other features of the comparative example are similar to those of the foregoing embodiment.

In the comparative example, the electric field becomes non-uniform in the region of the connection electrode 42-3. When the display panel is pushed directly or with the touch panel interposed, the liquid crystals are not easily restored to the normal state which they are in before the display panel is pushed. As a result, the time required for the surface depression defect to disappear is inevitably long. It may also happen that the alignment of the liquid crystals is fixed in an abnormal state different from the normal state, and the defect cannot be resolved.

Figure 9:
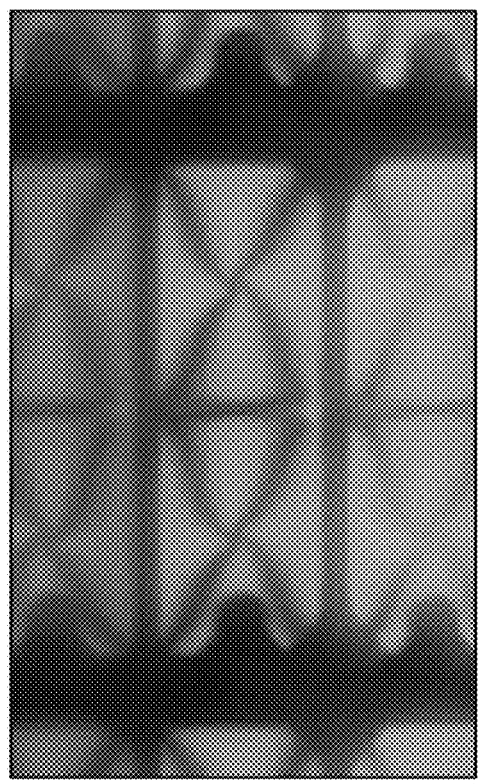
FIG. 9 illustrates a display state of the display panel of the comparative example.
Figure 9:
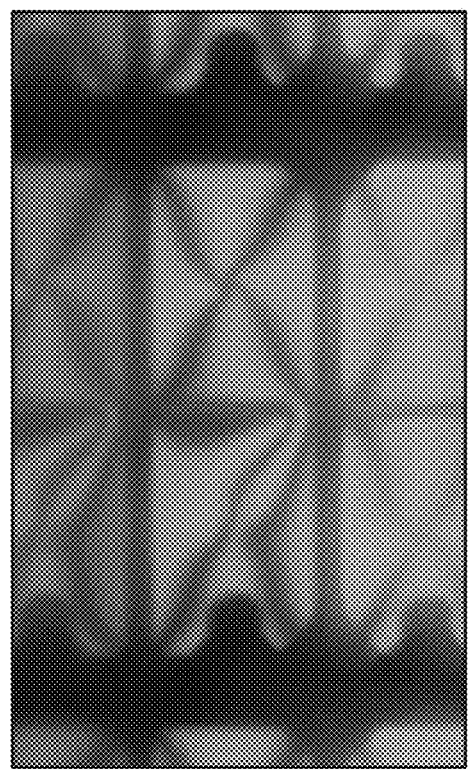

FIG. 9 illustrates a display state of the display panel of the comparative example. FIG. 9(*a*) illustrates a case where the liquid crystals are in the normal alignment state, i.e., the display state of the case where the display panel is not pressed. FIG. 9(*b*) illustrates a case where the liquid crystals are in an abnormal alignment state, i.e., the display state of the case where the display panel is pressed.

As can be seen from FIG. 9(*b*), the liquid crystals are not restored to the normal alignment state in the region of the connection electrode 42-3, and the alignment of the liquid crystals is disturbed. As a result, a display defect occurs.

In the present embodiment, there is no electrode corresponding to the connection electrode 42-3 of the comparative example, and the electric field applied to the liquid crystal layer is prevented from becoming non-uniform. FIG. 10 illustrates a display state of the display panel 11 of the present embodiment. FIG. 10 illustrates how the display state is after the display panel 11 is depressed.

As illustrated in FIG. 10, the display panel 11 of the present embodiment does not include a region where the electric field applied to the liquid crystal layer becomes non-uniform. Even when the display panel 11 is pushed directly or with the touch panel interposed, the liquid crystals can return to the normal alignment state, and the surface depression defect can disappear in a short time.

[6] Advantages

As detailed above, in the first embodiment, the display panel 11 has the vertical alignment (VA) mode. Each of the pixels 20 of the display panel 11 includes pixel electrodes 42-1 and 42-2 arrayed in the long side direction (Y direction) of the pixel 20, an electrode 38 arranged in the layer lower than that of the pixel electrodes 42-1 and 42-2 and extending in the Y direction, and contact members 43-1 and 43-2 for connecting the pixel electrodes 42-1 and 42-2 and the electrode 38.

In the first embodiment, therefore, the boundary between the pixel electrodes 42-1 and 42-2 does not include a region where the electric field is non-uniform. Even when the display panel 11 is pushed, the liquid crystals are easily restored to the normal state which they are in before the display panel 11 is pushed. As a result, the time required for the surface depression defect to disappear can be shortened.

The contact members 43-1 and 43-2 are arranged such that, when viewed in the plan view, they do not overlap the projections 48 used for controlling the liquid crystal alignment. With this structure, the liquid crystals can align in a stable manner, and the surface depression defect can disappear in a short time.

In addition, the storage electrode 40 is arranged on the boundary between the pixel electrodes, and this storage electrode 40 is applied with the same potential as is applied to the common electrode 47. With this structure, the liquid crystals can easily return to the normal alignment state in the boundary region between the pixel electrodes, and the surface depression defect can disappear in a short time.

The electrode 38 for connecting the pixel electrodes 42-1 and 42-2 is formed in the same step as the drain electrode 37, and is formed of the same material as the drain electrode 37. Because of this, the advantages mentioned above can be obtained with no need to add a step in which only the electrode 38 is formed.

A description will be given of results of the surface push test performed for the display panel 11. FIG. 11 is a schematic diagram illustrating how a surface push test is performed for the display panel 11.

The test method is that the screen center of the display panel 11 is pushed with a push-pull gauge and the state of bright points caused by the disturbance of the liquid crystal alignment is visually observed. The push speed is nearly equal to 10 mm/min, and the pull speed is nearly equal to 100 mm/min. When the load of the push-pull gauge becomes nearly equal to 10N, this condition is maintained for five seconds, and then the push-pull gauge is separated from the display panel 11. Subsequently, white spots on the display panel 11 are observed. The brightness is graded in units of 10% from 100% (white display) to 0% (black display), and the test is performed for each gradation display level.

FIG. 12 shows results of the surface push test performed for the display panel 11. The comparative example panel corresponds to a display panel according to the above-mentioned comparative example, and the embodiment panel corresponds to a display panel according to the present embodiment. In FIG. 12, the times required for white spots to disappear are indicated. The symbol "×" shows that white spots continue to exist for 30 seconds or longer, and the symbol "○" shows that no white spot is generated.

As shown in FIG. 12, the time required for white spots to disappear (for the surface depression defect to disappear) is shorter in each gradation level of the embodiment than in the corresponding gradation level of the comparative example. It should be also noted that the surface depression defect disappears within four seconds in each gradation level of the embodiment.

Second Embodiment

The second embodiment is an embodiment in which the liquid crystal alignment is controlled using openings formed in the common electrode 47, in place of the projections 48 of the first embodiment.

Figure 13:
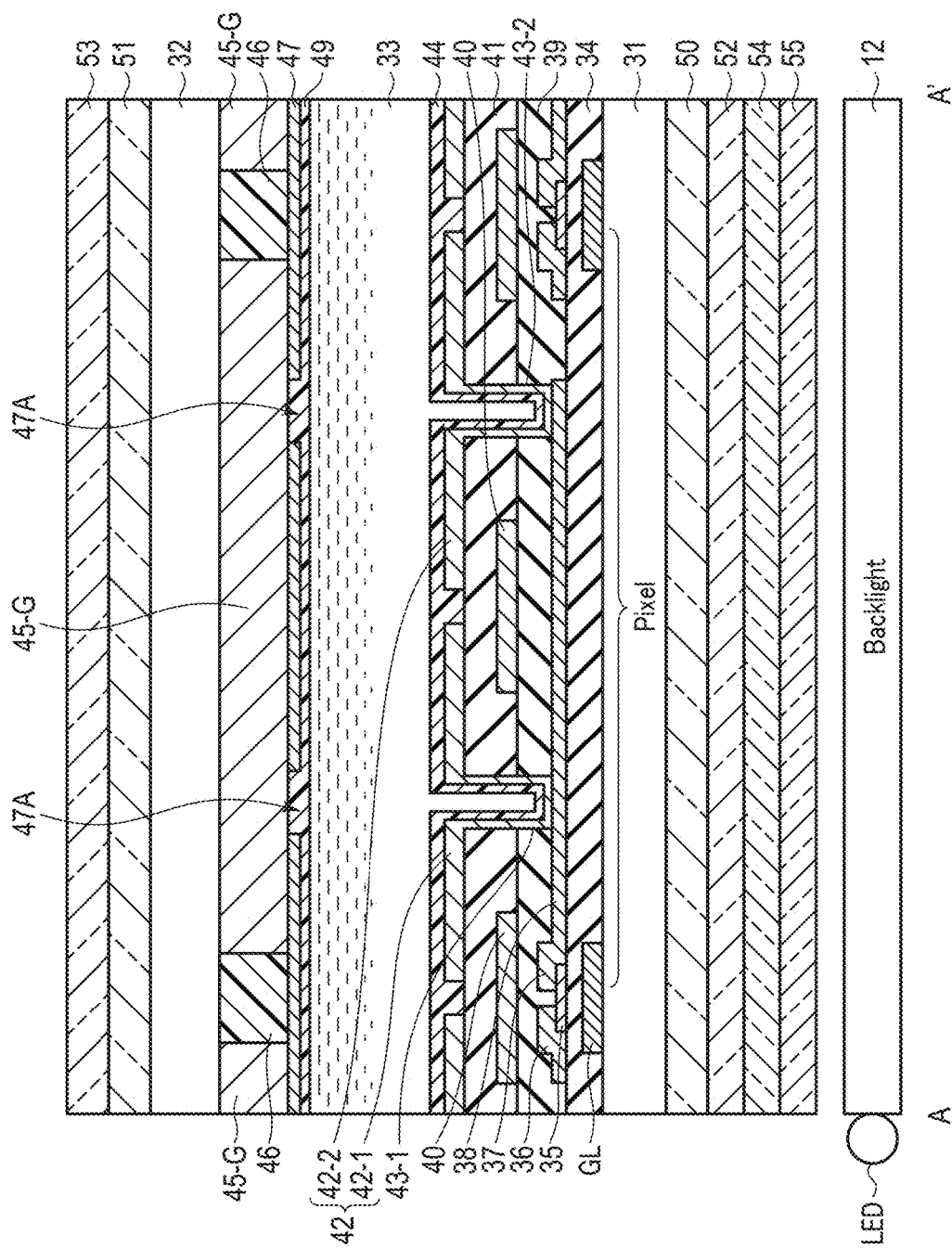
FIG. 13 is a sectional view of a display panel according to the second embodiment.

FIG. 13 is a sectional view of a display panel 11 according to the second embodiment. The plan view of the display panel 11 of the second embodiment is similar to that shown in FIGS. 4 and 5, except for the projections 48. FIG. 13 is a sectional view taken along the line corresponding to line A-A' of FIG. 4.

A plurality of openings 47A, used for controlling the alignment of the liquid crystals, are provided in the common electrode 47. The positions and the planar shape of the openings 47A are substantially similar to those of the projections 48 of the first embodiment. To be more specific, the planar shape of each opening 47A is a circle, for example.

The electric field applied to the liquid crystal is weak in the region of each opening 47A. In other words, the liquid crystal molecules keep aligning substantially in the vertical direction in the region of each opening 47A, and each opening 47A is the alignment center of liquid crystals. The other features of the second embodiment are similar to those of the first embodiment. The structure shown in FIG. 13 enables a multi-domain system, as in the first embodiment. In addition, the display panel 11 of the second embodiment produces the same advantages as the first embodiment.

Third Embodiment

FIG. 14 is a sectional view of a display panel 11 according to the third embodiment. The plan view of the display panel 11 of the third embodiment is similar to that shown in FIGS. 4 and 5. FIG. 14 is a sectional view taken along the line corresponding to line A-A' of FIG. 4.

An electrode 38 is electrically connected to a drain electrode 37, and electrically connects pixel electrodes 42-1 and 42-2 to each other through contact members 43-1 and 43-2. The electrode 38 is a transparent electrode (formed, for example, of an ITO). The connection portion 38A of the electrode 38 is also a transparent electrode (formed, for example, of an ITO).

The transmittance can be enhanced by forming the electrode 38 as a transparent electrode. The other features of the third embodiment are similar to those of the first embodiment.

In each of the foregoing embodiments, the planar shape of the storage electrode is not limited to that shown in FIG. 5. The storage electrode may have any shape as long as it can constitute a storage capacitor. For example, the storage electrode may be a line type electrode extending in the X direction and overlapping a pixel electrode.

In the present specification, the terms "plate" and "film" are exemplary expressions of members, and do not limit the structures of the members. For example, the retardation plates are not limited to plate-like members; they may be films or any other types of members having the function described in the specification. The polarizers are not limited to plate-like members; they may be films or any other types of members having the function described in the specification.

The liquid crystal display of each of the foregoing embodiments is applicable to various electronic devices having the image display function. For example, the liquid crystal display can be applied to a mobile device (such as a mobile phone, a mobile information terminal, a smartphone, a tablet terminal or the like), a game console, a notebook personal computer (PC), a digital video camera, a digital still camera, a scanner, etc.

The present invention is not limited to the above-described embodiments, and can be modified in various manners when reduced to practice, without departing from the gist of the invention. In addition, the above-described embodiments include inventions of various stages, and a variety of inventions can be derived by properly combining structural elements of one embodiment or by properly combining structural elements of different embodiments. For example, if the object of the invention is achieved and the advantages of the invention are attained even after some of the structural elements disclosed in connection with the embodiments are omitted, the embodiment made up of the resultant structural elements can be extracted as an invention.

What is claimed is:
1. A liquid crystal display comprising:
a first substrate and a second substrate arranged to face each other;
a liquid crystal layer provided between the first substrate and the second substrate and having a vertical alignment (VA) mode;

a first electrode provided on the first substrate and extending in a first direction;

a first pixel electrode and a second pixel electrode which are provided in one pixel region and above the first electrode, with an insulating layer interposed, and which are arrayed in the first direction;

a first contact member which connects the first electrode and the first pixel electrode to each other;

a second contact member which connects the first electrode and the second pixel electrode to each other;

a storage electrode provided between the first electrode and the first pixel electrode and between the first pixel electrode and the second pixel electrode; and a common electrode provided on the second substrate, the storage electrode being applied with a voltage equal to that applied to the common electrode.

2. The liquid crystal display according to claim 1, further comprising:

a switching element provided on the first substrate, the first electrode being connected to the switching element.

3. The liquid crystal display according to claim 2, wherein the switching element includes a source electrode and a drain electrode, and the first electrode is connected to the drain electrode and is formed of a material identical to that of the drain electrode.

4. The liquid crystal display according to claim 1, wherein the storage electrode is further provided between adjacent pixels.

5. The liquid crystal display according to claim 1, further comprising:

a projection provided on the second substrate and controlling alignment of the liquid crystal layer, the projection being arranged to overlap the first contact member.

6. The liquid crystal display according to claim 1, wherein the common electrode includes an opening which controls alignment of the liquid crystal layer, and the opening is provided to overlap the first contact member.

7. The liquid crystal display according to claim 1, wherein a boundary between the first pixel electrode and the second pixel electrode is in a center of the pixel.

8. The liquid crystal display according to claim 1, wherein the first contact member is arranged in a center of the first pixel electrode, and the second contact member is arranged in a center of the second pixel electrode.

9. The liquid crystal display according to claim 1, wherein the first electrode is arranged in a center of the pixel, as viewed in a second direction intersecting with the first direction.

10. The liquid crystal display according to claim 1, wherein the first contact member is formed of a material identical to that of the first pixel electrode, and the second contact member is formed of a material identical to that of the second pixel electrode.

11. The liquid crystal display according to claim 1, wherein the first electrode is a transparent electrode.

* * * * *